US008878664B1

(12) United States Patent
Yu et al.

(10) Patent No.: US 8,878,664 B1
(45) Date of Patent: Nov. 4, 2014

(54) TIRE STATUS RECEIVING SYSTEM

(71) Applicant: Cub Elecparts Inc., Fuxing Township, Changhua County (TW)

(72) Inventors: Yu-Tao Yu, Fuxing Township, Changhua County (TW); Tsan-Nung Wang, Hemei Township, Changhua County (TW); Chao-Ching Hu, Tainan (TW); Tzu-Wen Ko, Changhua (TW); Ya-Ling Chi, Taichung (TW); Chi-Hung Chen, Fuxing Township, Changhua County (TW)

(73) Assignee: Cub Elecparts Inc., Fuxing Township, Changhua County (TW)

( * ) Notice: Subject to any disclaimer, the term of this patent is extended or adjusted under 35 U.S.C. 154(b) by 66 days.

(21) Appl. No.: 13/868,882

(22) Filed: Apr. 23, 2013

(51) Int. Cl.
*B60C 23/00* (2006.01)
*B60R 25/10* (2013.01)
*B60C 23/02* (2006.01)
*G01M 17/00* (2006.01)
*B60C 23/04* (2006.01)

(52) U.S. Cl.
CPC .................................. *B60C 23/0447* (2013.01)
USPC ...... 340/447; 340/442; 340/426.33; 116/34 R; 116/34 A; 701/29

(58) Field of Classification Search
CPC ............ B60C 23/0408; B60C 23/0472; B60C 23/0433; B60C 23/0466; B60C 23/064

USPC ......... 340/442, 447, 426.33; 116/34 R, 34 A; 701/29

See application file for complete search history.

(56) References Cited

U.S. PATENT DOCUMENTS

| 6,417,766 | B1 * | 7/2002 | Starkey | 340/447 |
| 7,260,371 | B1 * | 8/2007 | Yones | 455/186.1 |
| 8,134,453 | B2 * | 3/2012 | Ootsuka | 340/12.22 |
| 2004/0193341 | A1 * | 9/2004 | Katou | 701/29 |
| 2010/0134269 | A1 * | 6/2010 | Zhu et al. | 340/447 |
| 2010/0141416 | A1 * | 6/2010 | Kukshya et al. | 340/447 |

* cited by examiner

*Primary Examiner* — George Bugg
*Assistant Examiner* — Munear Akki
(74) *Attorney, Agent, or Firm* — Muncy, Geissler, Olds & Lowe, P.C.

(57) ABSTRACT

A tire status receiving system includes a first signal converter module including a first microcontroller unit, a wireless receiver unit for receiving a wireless signal from a tire status sensor and providing the wireless signal to the first microcontroller unit for enabling the first microcontroller unit to convert the wireless signal into a code for information interchange for output through an output unit being electrically coupled to the first microcontroller unit, and a second signal converter module including a second microcontroller unit, a memory unit for storing tire status sensor ID codes and predetermined alarm threshold values, an interface unit for communication with the output unit to receive data, a power supply unit to provide the necessary working electricity, and a communication port electrically coupled to the second microcontroller unit and having installed therein signal transmission circuit and a charging circuit.

7 Claims, 3 Drawing Sheets

TIRE STATUS RECEIVING SYSTEM

BACKGROUND OF THE INVENTION

1. Field of the Invention

The present invention relates to tire status monitoring technology and more particularly, to a tire status receiving system, which is a plug-and-play system that is applicable to any car without permanent installation.

2. Description of the Related Art

For driving safety considerations, many cars have a tire status sensor installed in each tire thereof to provide real-time tire status data to a receiver unit in the respective car for display on a linked display screen, enabling the car driver to know the status of each tire on the real time. However, the application of this kind of tire status monitoring system has limitations. Normally, the receiver unit and the display device of a tire status monitoring system are mounted and fixed inside the car. For enabling a car without receiver unit to provide a tire status monitoring function, the car must be modified before operation, i.e., a receiver unit and a display screen must be mounted inside the car. This will be a big problem for general users. Therefore, it is desirable to provide a simple tire status monitoring system.

SUMMARY OF THE INVENTION

The present invention has been accomplished under the circumstances in view. It is the main object of the present invention to provide a tire status receiving system, which has plug-and-play characteristics and is applicable to any car without the need to modify the body of the car.

To achieve this and other objects of the present invention, a tire status monitoring system comprises a first signal converter module and a second signal converter module. The first signal converter module comprises a first microcontroller unit adapted for converting a modulation code signal into a code for information interchange, a wireless receiver unit electrically coupled to the first microcontroller unit and adapted for receiving a modulation code signal from a tire status sensor and transmitting the modulation code signal to the first microcontroller unit for enabling the modulation code signal to be converted by the first microcontroller unit into a code for information interchange, and an output unit electrically coupled to the first microcontroller unit and controllable by the first microcontroller unit to output each code for information interchange converted by the first microcontroller unit. The second signal converter module comprises a second microcontroller unit adapted for matching the content of a code for information interchange with predetermined tire alarm threshold values and checking a linking status of the second signal converter module, a memory unit electrically coupled to the second microcontroller unit for storing tire status sensor ID codes and tire alarm threshold values, an interface unit electrically coupled to the second microcontroller unit for communication with the output unit of the first signal converter module to receive each data signal outputted by the output unit, a power supply unit electrically coupled to the second microcontroller unit to provide electricity to the second signal converter module for working, and a communication port electrically coupled to the second microcontroller unit and having installed therein a signal transmission circuit and a charging circuit.

Other advantages and features of the present invention will be fully understood by reference to the following specification in conjunction with the accompanying drawings, in which like reference signs denote like components of structure.

DETAILED DESCRIPTION OF THE INVENTION

Figure 1:
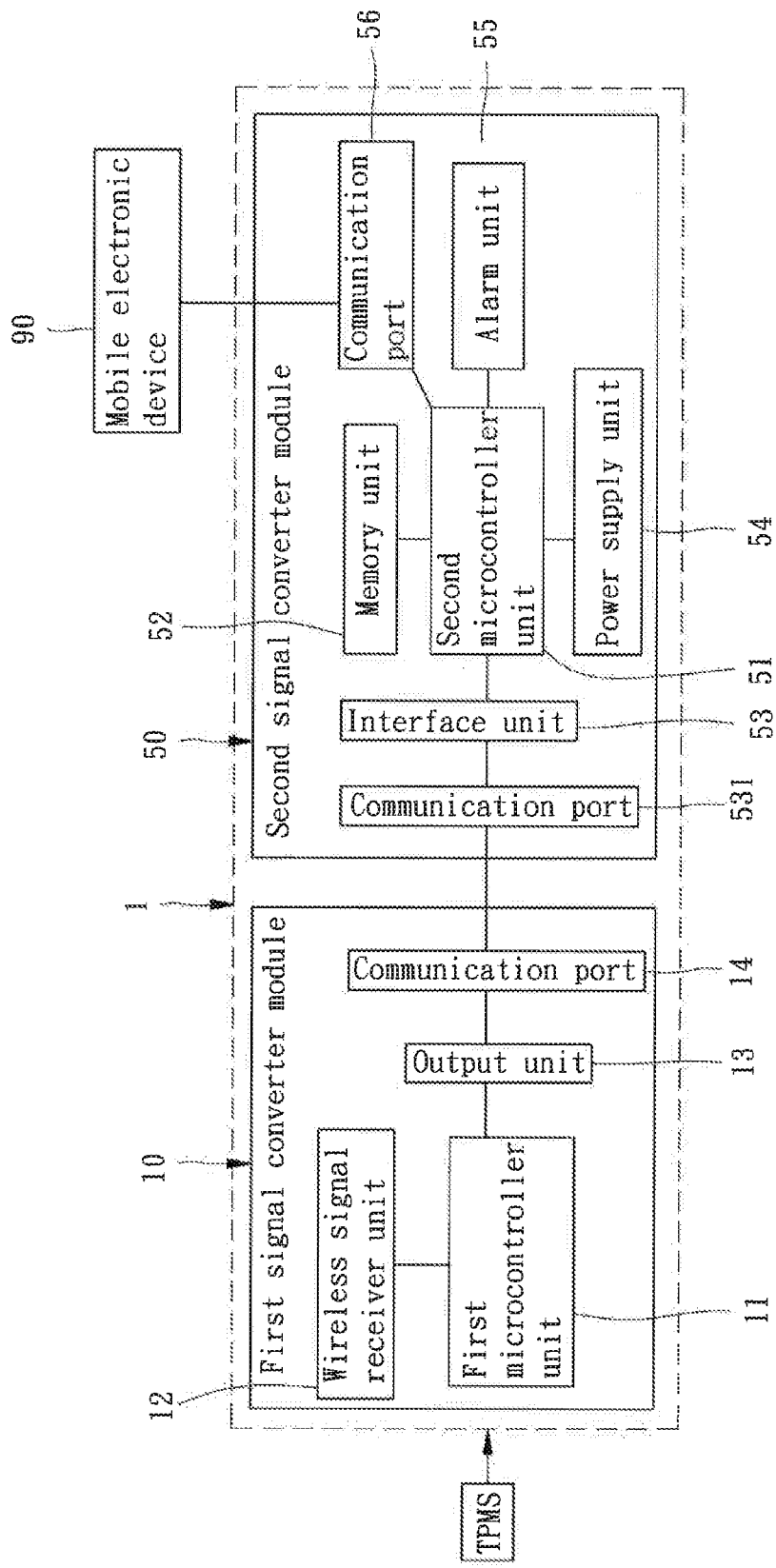
FIG. 1 is a block diagram of a first signal converter module and a second signal converter module of a tire status monitoring system in accordance with the present invention.

Referring to FIG. 1, a tire status receiving system in accordance with the present invention is shown. The tire status receiving system 1 comprises a first signal converter module 10, a second signal converter module 50, and a mobile electronic device 90. The mobile electronic device 90 is equipped with a display screen.

The first signal converter module 10 comprises a first microcontroller unit 11, a wireless signal receiver unit 12 electrically coupled to the first microcontroller unit 11 and adapted for transmitting a modulated signal received from a tire status sensor to the first microcontroller unit 11, and an output unit 13 electrically coupled to the first microcontroller unit 11. The first microcontroller unit 11 is adapted to convert the modulation code of the modulated signal provided by the wireless receiver unit 12 into a code for information interchange and then to output the signal through the output unit 13. The output unit 13 can be configured to output the signal wirelessly. Alternatively, the output unit 13 can be configured to provide a communication port 14 for signal output through a cable. For example, the modulated signal received by the wireless signal receiver unit 12 can be an amplitude-shift keying signal or frequency-shift keying signal that is converted by the first microcontroller unit 11 into an ASCII (American Standard Code for Information Interchange) signal for output.

The second signal converter module 50 comprises a second microcontroller unit 51, a memory unit 52, an interface unit 53, a power supply unit 54, an alarm unit 55, and a communication port 56. The second microcontroller unit 51 is adapted for matching the content of a code for information interchange with predetermined tire alarm threshold values and checking a linking status of the second signal converter module 50. The memory unit 52 is electrically coupled with the second microcontroller unit 51 for storing TPMS (Tire Pressure Monitoring System) ID codes and alarm threshold values. The interface unit 53 is electrically connected to the second microcontroller unit 51 for communication with the output unit 13 of the first signal converter module 10 to receive data outputted by the output unit 13. The interface unit 53 is configured to it the output unit 13 of the first signal converter module 10. If the output unit 13 is configured to output signals in a wireless manner, the interface unit 53 should be configured in the form of a wireless signal receiver for receiving wireless signals transmitted by the output unit 53. On the contrary, if the output unit 13 is configured to output signals in a wired manner, the interface unit 53 should be electrically connected to the communication port of the output unit 13 for receiving signals from the output unit 13. The power supply unit 54 is electrically connected to the second microcontroller unit 51 to provide t electricity to the second signal converter module 50 for working. Further, the first signal converter module 10 and the second signal converter module 50 can be respectively equipped with one respective power supply unit. Alternatively, the first signal converter module 10 and the second signal converter module 50 can share a common power supply unit. Further, the power supply unit 54 can be a battery, or an external power source, for example, the car battery power supply. The alarm unit 55 is electrically coupled to the second microcontroller unit 51, and controllable by the second microcontroller unit 51 to give off a warning signal. Further, the alarm unit 55 can be an alarm signal light or audio alarm. The communication port 56 is electrically coupled to the second microcontroller unit 51, having installed therein a signal transmission circuit and a charging circuit.

The mobile electronic device 90 is electrically connected to the communication port 56 of the second signal converter module 50 by a cable. In this embodiment, the communication port 56 is a USB port. Further, the mobile electronic device 90 can be a PDA, smart phone, iPad, or any other tablet computer.

Figure 3:
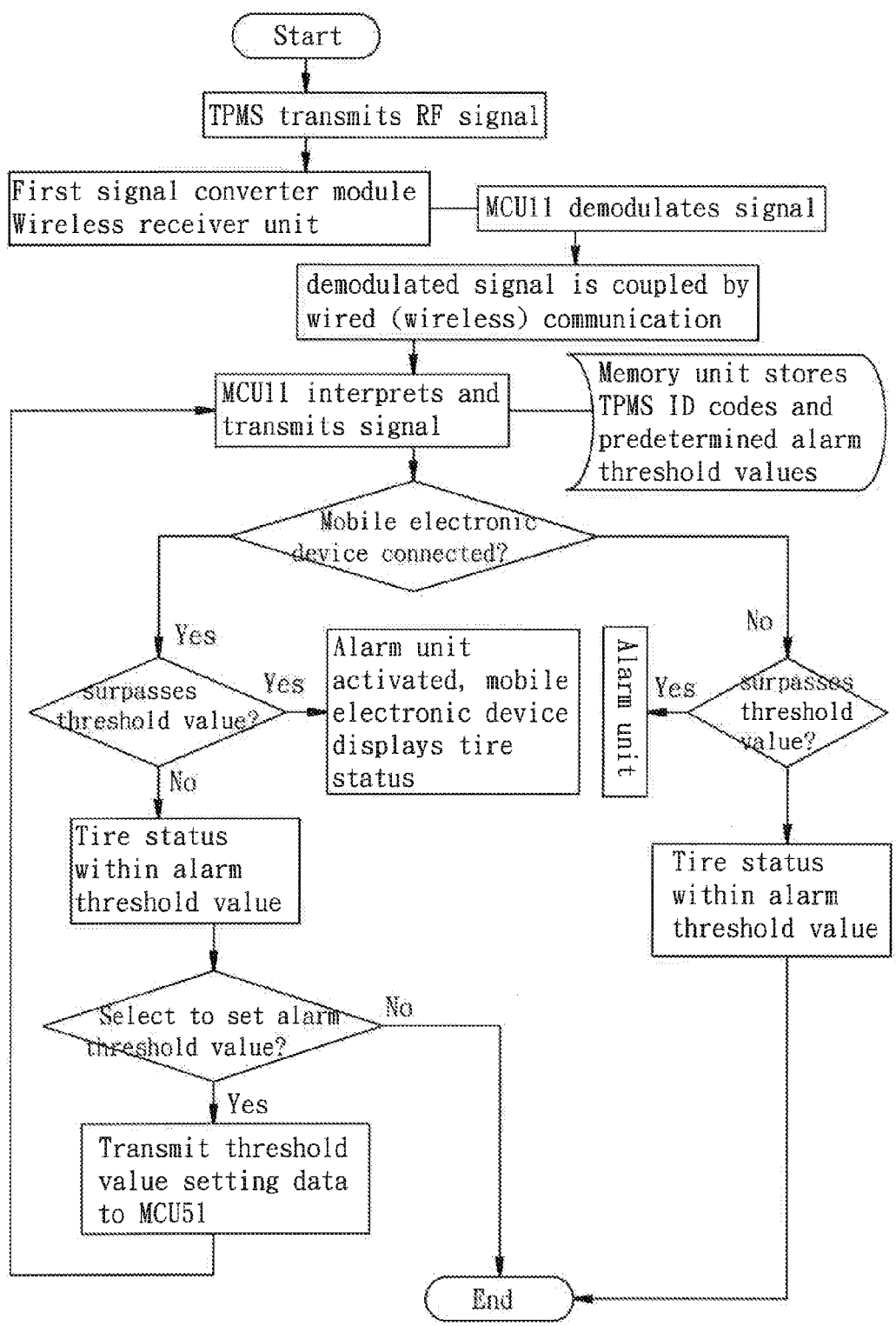
FIG. 3 is an operational flow chart of the present invention.

As illustrated in FIG. 3, the tire status receiving system can use the car battery power supply directly. When the TPMS (Tire Pressure Monitoring System) transmits a modulated signal containing the measured data, such as pressure, temperature, acceleration and/or battery level in a wireless manner, the wireless receiver unit 12 of the first signal converter module 10 can receive this modulated signal and send it to the first microcontroller unit 11, enabling this modulated signal to be converted into a code for information interchange by the first microcontroller unit 11 and then outputted through the output unit 13. The output unit 13 can be a physical communication port, or a wireless signal transmitter. The signal outputted by the output unit 13 can then be received by the interface unit 53 of the second signal converter module 50, and then provided to the second microcontroller unit 51. Upon receive of the signal from the interface unit 53, the second microcontroller unit 51 interprets the format and content of the signal, assuring data accuracy and integrity. At this time, the second microcontroller unit 51 matches the received data with a predetermined TPMS (Tire Pressure Monitoring System) ID code and alarm threshold value stored in the memory unit 52, and checks the connection status between the second signal converter module 50 and the mobile electronic device 90.

If the second signal converter module 50 is not in connection with the mobile electronic device 90 and the tire status is within the safety range, the second microcontroller unit 51 takes no action. However, if the tire status surpasses the alarm threshold value at this time, the second microcontroller unit 51 provides a signal to the alarm unit 55, driving the alarm unit 55 to give off an alarm signal, for example, to give off a flashing light or warning sound, reminding the user that the tires are likely to have safety problems.

If the second signal converter module 50 is in connection with the mobile electronic device 90 and the tire status is within the safety range, the current tire status data is displayed on the display screen of the mobile electronic device 90. However, if the tire status surpasses the alarm threshold value at this time, the second microcontroller unit 51 drives the alarm unit 55 to give off an alarm signal and enables the display screen of the mobile electronic device 90 to display the current tire status data, reminding the user that the tires are likely to have safety problems.

Figure 2:
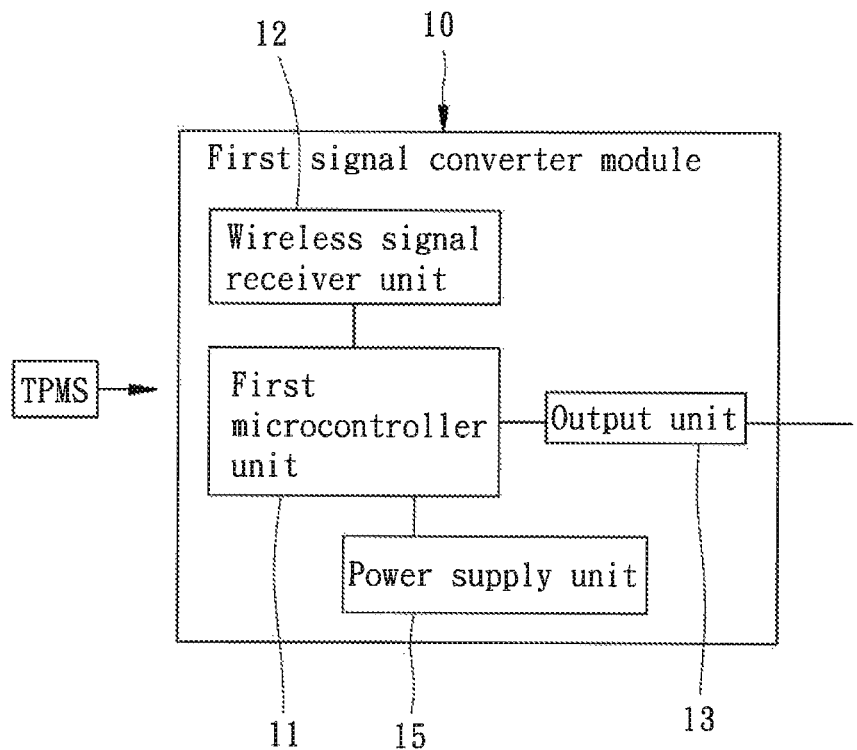
FIG. 2 is a block diagram of an alternate form of the first signal converter module in accordance with the present invention.

Further, the first signal converter module 10 can be used independently. In a second embodiment of the present invention, as shown in FIG. 2, the first signal converter module 10 comprises a first microcontroller unit 11, a wireless signal receiver unit 12 electrically coupled to the first microcontroller unit 11 and adapted for transmitting a modulated signal received from a tire status sensor to the first microcontroller unit 11, an output unit 13 electrically coupled to the first microcontroller unit 11, and a power supply unit 15 electrically coupled to the first microcontroller unit 11 for providing electricity to the first signal converter module 10 for working. The first microcontroller unit 11 is adapted to convert the modulation code of the modulated signal provided by the wireless receiver unit 12 into a code for information interchange and then to output the signal through the output unit 13. The output unit 13 can be configured to output the signal wirelessly. Alternatively, the output unit 13 can be configured to provide a communication port 14 for signal output through a cable. For example, the modulated signal received by the wireless signal receiver unit 12 can be an amplitude-shift keying signal or frequency-shift keying signal that is converted by the first microcontroller unit 11 into an ASCII (American Standard Code for Information Interchange) signal for output.

Thus, the first signal converter module 10 can convert the modulation code signal transmitted by the wire pressure sensor into a code for information interchange and then outputs the code for information interchange. Further, the user using the present invention can use the mobile electronic device to alter the tire status alarm threshold values. These tire status alarm threshold values can be stored in the memory unit for matching.

The tire status receiving system can be used in any car. After installation of a TPMS in the tires of the car, the tire status receiving system of the present invention can be used with a smart phone, PDA, tablet computer, or any of a variety of other mobile electronic devices in the car for monitoring the status of the tires, greatly saving the installation cost and effectively increasing driving safety. Further, the charging design of the communication port of the second signal converter module is capable of charging the battery of the smart phone, PDA, tablet computer, or any other mobile electronic device in use, extending the operating time of the mobile electronic device and overcoming the problem of high power consumption of the mobile electronic device.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire status receiving system, comprising:
    a first signal converter module comprising:
    a first microcontroller unit adapted for converting a modulation code signal into a code for information interchange;
    a wireless receiver unit electrically coupled to said first microcontroller unit and adapted for receiving a modulation code signal from a tire status sensor and transmitting the modulation code signal to said first microcontroller unit for enabling the modulation code signal to be converted by said first microcontroller unit into a code for information interchange; and
    an output unit electrically coupled to said first microcontroller unit and controllable by said first microcontroller unit to output each code for information interchange converted by said first microcontroller unit; and
    a second signal converter module comprising:
    a second microcontroller unit adapted for matching the content of a code for information interchange with predetermined tire alarm threshold values and checking a linking status of said second signal converter module;

a memory unit electrically coupled to said second microcontroller unit for storing tire pressure sensor ID codes and tire alarm threshold values;

an interface unit electrically coupled to said second microcontroller unit for communication with said output unit of said first signal converter module to receive each data signal outputted by said output unit;

a power supply unit electrically coupled to said second microcontroller unit to provide electricity to said second signal converter module for working; and a communication port electrically coupled to said second microcontroller unit, said communication port comprising signal transmission circuit means and charging circuit means.

2. The tire status receiving system as claimed in claim 1, wherein said second signal converter module further comprises an alarm unit electrically coupled to said second microcontroller unit, said alarm unit being an alarm signal light.

3. The tire status receiving system as claimed in claim 1, wherein said second signal converter module further comprises an alarm unit electrically coupled to said second microcontroller unit, said alarm unit being an audio alarm.

4. The tire status receiving system as claimed in claim 1, wherein said power supply unit is electrically coupled to a car battery power supply.

5. The tire status receiving system as claimed in claim 1, wherein said communication port is a USB port.

6. The tire status receiving system as claimed in claim 1, wherein said communication port is linked with a mobile electronic device comprising a display screen.

7. The tire status receiving system as claimed in claim 1, wherein said output unit of said first signal converter module output unit comprises a communication port; said interface unit of said second signal converter module comprises a communication port electrically coupled to the communication port of said first signal converter module output unit.

\* \* \* \* \*